United States Patent Office 3,269,170
Patented August 30, 1966

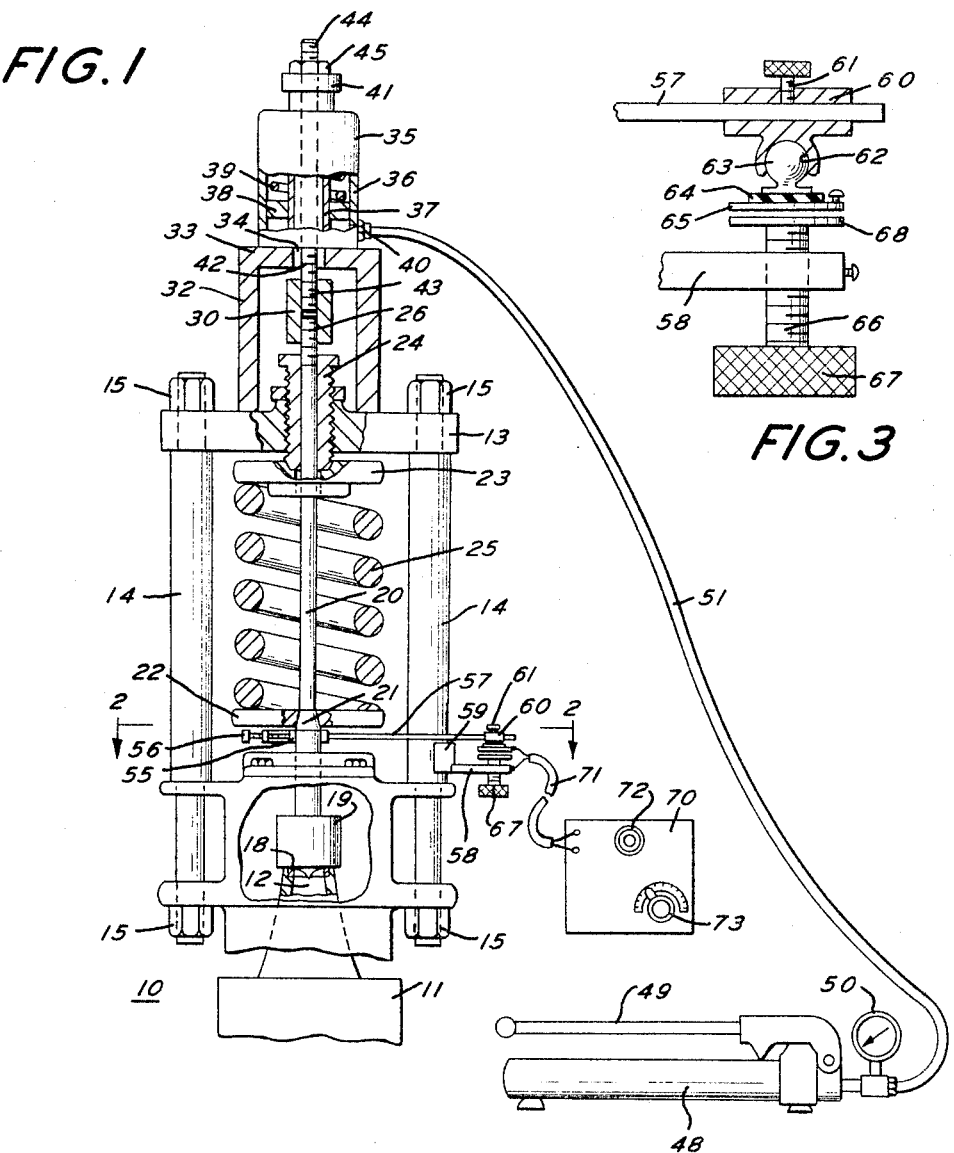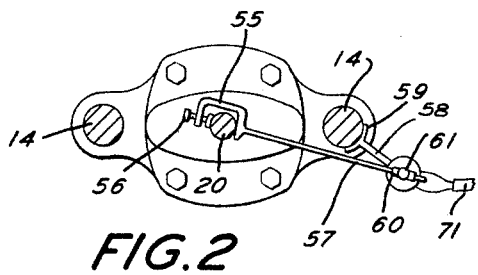

1

3,269,170
PRESSURE RELIEF VALVE TESTING APPARATUS
Edward H. Sebring, Box 144, Rte. 2, Street, Md., and
James J. Hackett, 46 Barclay Drive, Turnersville, N.J.
Filed Sept. 28, 1964, Ser. No. 399,512
8 Claims. (Cl. 73—4)

This invention relates to pressure relief valve testing apparatus and more particularly to simple but effective apparatus for such testing.

In the conventional steam pressure relief valves, employed on steam generators, pressure vessels and the like, the force of a spring under compression acts on a valve to keep the valve closed against the opposing steam pressure. When the steam pressure rises above the value for which the valve has been set the force exerted by the steam pressure will exceed the force exerted by the spring, the valve disc will start to lift and steam will begin to discharge. An initial light discharge of steam will cause the valve to pop open and it will not reseat until the pressure is relieved to a predetermined value slightly below the pressure setting.

Pressure relief valves are normally set at the factory and if the valve is disassembled for inspection, cleaning or for any reason, the factory setting is lost. It thus becomes necessary to check and adjust the setting.

The customary practice heretofore, for pressure relief or safety valves for boilers, was to allot a boiler specifically for this purpose, then to seal off the other safety valves on this boiler and raise the pressure until the valve under test popped. This procedure was very expensive, time consuming, noisy and dangerous.

Other discharge pressure testing devices for such valves have been proposed but these were susceptible to serious errors where the readings were taken at a location along the valve spindle remote from the valve plug so that the extensibility of the valve spindle was a factor.

It is the principal object of the present invention to provide apparatus for testing, checking and determining the setting required for a pressure relief valve.

It is a further object of the present invention to provide apparatus for testing, checking and determining the setting required for a pressure relief valve so that adjustments can be forthwith be made and checked.

It is a further object of the present invention to provide apparatus for testing, and determining the setting of a pressure relief valve which is free from hazard, avoids undesired noise, and which has a high order of accuracy.

It is a further object of the present invention to provide apparatus for testing and determining the setting of a pressure relief valve which can be employed without the complication of boiler set up heretofore required and which can be carried out with the valve before it has been mounted in place for use.

It is a further object of the present invention to provide apparatus for testing and determining the setting of a pressure relief valve having a simple but effective structure for determining incipient movement of the valve spindle.

Other objects and advantageous features of the invention will be apparent from the description and claims.

The nature and characteristic features of the invention will be more readily understood from the following description, taken in connection with the accompanying drawings forming part thereof, in which:

FIGURE 1 is a view partly in elevation and partly in section showing the apparatus of the present invention applied to a pressure relief valve;

FIG. 2 is a transverse sectional view taken approximately on the line 2—2 of FIG. 1;

2

FIG. 3 is a fragmentary sectional view, enlarged, taken approximately on the line 3—3 of FIG. 2; and FIG. 4 is a fragmentary view in elevation showing a different manner of observing the movement.

It should, of course, be understood that the description and drawings herein are illustrative merely, and that various modifications and changes can be made in the structure disclosed without departing from the spirit of the invention.

Referring more particularly to the drawings a pressure relief valve is shown at 10 having a housing 11 with an inlet 12 and a yoke 13 in spaced relation thereto and held by yoke rods 14 with nuts 15 on their threaded ends. Within the housing 11 and communicating with the inlet 12 a seat bushing 18 is provided for seating of a valve disc 19. The valve disc 19 has a spindle 20 secured thereto and extending therefrom with a shoulder 21 engaged by a bottom spring washer 22, providing a spring abutment. A top spring washer 23 is adjustably positioned by an adjusting collar 24 threaded in the yoke 13. A helical spring 25 between the spring washers 22 and 23 normally urges the valve disc to seated position, the setting of the spring 25 determining the pressure at which the valve disc 19 will move to open. The spindle 20 has a threaded end 26 for attachment of a release nut (not shown) forming part of the drop or popping mechanism which is removed for attachment of the apparatus of the present invention.

The apparatus of the invention preferably includes an internally threaded coupling 30 for attachment to the threaded end 26 of the spindle 20.

A mounting sleeve 32 is provided having an end wall 33, with an opening 34, for superposition on the yoke 13. A hollow hydraulic ram 35 of well known type can be employed, supported by the sleeve 32. The ram 35 has an outer body 36, an inner plunger guide 37, a plunger 38 and return spring 39 in engagement therewith. A packing (not shown) is provided for the plunger 38 to prevent fluid leakage therealong. A fluid inlet connection 40 is provided to the interior space between the guide 37 and body 36 and below the plunger 38 for fluid supply and exhaust.

The upper end of the plunger 38 is provided with a saddle 41. A spindle extension rod 42 has its lower end 43 in threaded engagement in the coupling 30 and has an upper threaded end 44 with a holding nut 45 thereon engaged with the saddle 41.

A hydraulic pump 48 is provided having a normal operating handle 94 and pressure gage 50 showing the delivered pressure is connected by a pipe 51 to the fluid inlet connection 40.

A motion take off C clamp 55 is provided removably secured to the spindle 20 and has a screw 56 for tightening the clamp 55 in place. The clamp 55 is preferably located as close to the valve disc 19 as possible to minimize the effects of extension of the spindle 20 as hereinafter referred to.

The clamp 55 has a horizontal arm 57 which preferably extends close to and beyond one of the yoke rods 14. To this yoke rod 14, a horizontal motion comparator bracket arm 58 is attached in any desired manner, such as by a magnetic grip member 59.

While visual comparison of the relative positions of the bracket arm 58 and arm 57 may be made it is preferred to reduce the burden on the operator and increase the reliability of the test. For this purpose the arm 57 has slidably positioned thereon a bracket 60 with a tightening screw 61. The bracket 60 has a socket 62 for a ball 63 providing a universal joint for carrying an insulating plate 64 and capacitor plate 65, preferably of circular disc shape.

The arm 58 has an adjusting screw 66, with fine threads, engaged therewith. The screw 66 has an enlarged manual operating head 67 and at its upper end has secured thereto a capacitor plate 68 similar to the plate 65 and for coaction therewith. The plates 65 and 68 are electrically connected to a capacitance test bridge 70 of known type by shielded leads 71.

The plates 65 and 68 can be of any desired size but plates of a diameter of one and one-half inches have been found satisfactory. The only requirement as to size is that the capacitance between the plates 65 and 68 must not be swamped by the parallel capacitance of the leads 71.

The test bridge 70 is of any desired type such as either of the capacitance test bridges type 740–B or 1611–B, marketed by General Radio Company which are provided with electron-ray tube null indicators and having high sensitivity and capable of readily detecting variations of 1 picofarad and of giving sharp indications of capacitance measurements in the range of 100 picofarads or less. The test bridge 70 preferably also has an electron ray tube null indicator 72 and a bridge adjusting dial 73.

The mode of operation will now be pointed out.

The pressure relief valve 10 to be tested is prepared for test by removal of the dust cover, drop lever, release nut and such other parts as are required to make room for the sleeve 32 and ram 35.

The coupling 30 is attached to the spindle 20. The sleeve 32 and ram 35 are then positioned above the valve 10, the holding nut 45 being applied and engaged with the saddle 41.

The C-clamp 51 is attached to the spindle 20 below the bottom spring washer 22 and as close to the valve disc 19 as possible. The magnetic grip member 59 is attached to the yoke rod 14 with the arm 58 in a direction such that the plate 64 is centered under the vertical projection of the arm 57. The bracket 60 is slid along the arm 57 until the plates 65 and 68 are in registration and the thumb screw 61 is tightened. The screw 66 is advanced and the universal joint 62, 63 is adjusted until the plates 65 and 68 are parallel and in contact. The plates 65 and 68 thus present a short-circuited input to the test bridge 70 and will provide increased brightness at the indicator 72. The screw 66 is then backed off just a sufficient distance from the indicator 72 to change to its normal brightness, thus indicating that the plates 65 and 68 are separated. The test bridge 70 is then balanced by movement of the dial 73 to a positive null indication, characterized by a wide "cat's eye" on the indicator tube 72.

The apparatus is now ready for application of hydraulic pressure to the ram 35 from the pump 48. As the pressure is increased at the ram 35 force is applied through the plunger 38, the saddle 41, the holding nut 48, the spindle extension rod 42 and the coupling 30 against the force of the spring 25.

The hydraulic pressure is thus applied and increased until the applied force balances the force of the spring. This hydraulic pressure, when operated on by a suitable conversion factor, is equivalent to the valve setting.

Incipient upward movement of the lower part of the valve spindle 20 close to the valve disc 19 will impart the same movement to the capacitor plate 65 which will begin to increase its clearance from the plate 68 with a corresponding decrement in the capacitance between the plates 65 and 68. The change in capacitance will unbalance the circuit of test bridge 70 and produce a readily apparent indication on the indicator 72. With the structure described above, a movement of the spindle 20 of one mil or less is readily detected without eye strain on the part of the operator.

In use on a valve connected to an operating boiler, the steam in the boiler supplies a substantial part of the force necessary to counterbalance the spring pressure and the hydraulic ram need only supply the differential between the force of the spring and the force exerted by the steam.

In this case, the hydraulic pressure to the ram 35 is increased, as before, until incipient movement occurs which may be detected as above. Alternatively, incipient movement may be detected aurally, by increasing the hydraulic pressure until the valve disc 19 is raised by the valve spindle 20 just enough to hear the "fret," a sizzling noise indicating that steam or other fluid is starting to escape. The force applied is not sufficient to open the valve disc 19 to an extent to actuate the blow down ring so that the valve 10 does not pop. Accordingly, there is no opening of the valve 10 nor blow off nor loss of pressure.

The pressure indicated on the pressure gage 50, when converted to equivalent valve pressure and added to the pressure in the boiler or other pressure vessel on which the valve 10 is mounted, gives the setting of the valve. The conversion factor is obtained from the relations that the differential of the fluid pressure on the exposed interior area of the valve plug 19 times that area algebraically added to the force of the spring 25 is equal to the product of the effective area of the ram and the hydraulic pressure acting thereon.

In the modification of FIG. 4, the arm 57 is positioned as in FIG. 2. A bracket arm 58' on a magnetic grip member 59', similar to the arm 58 and member 59, is attached to the yoke rod 14 and is similarly oriented with respect to the arm 57 except for being mounted above it instead of below. The arm 58' carries a conventional micrometer dial gage 80 having a contact element 81 which engage the arm 57.

In the operation of this modification, the member 59' is manipulated into the position in which contact element 81 just engages the arm 57. Slight movement of the spindle 20, of the order of 1 mil, can be detected on the dial gage.

It will thus be seen that simple but effective apparatus has been provided for attaining the objects of the invention.

We claim:

1. Apparatus for determining the pressure setting of a variable spring held seat engaging valve disc having a spindle extending from the valve disc and on which the spring is mounted comprising
   pressure responsive means connected to said spindle for exerting a force on said spindle in opposition to the force of the spring,
   a member for measuring the force applied at said pressure responsive means,
   a fixedly mounted reference member,
   a reference member between said valve disc and said spring and movable with said spindle and with respect to said fixedly mounted reference member, and
   movement responsive means responsive to relative movement of said reference members for indicating movement immediately prior to separation of the valve disc from its seat.

2. Apparatus for determining the pressure setting of a valve as defined in claim 1 in which
   said movably mounted reference member includes a clamp in engagement with said spindle.

3. Apparatus for determining the pressure setting of a valve as defined in claim 1 in which
   said movement responsive means includes facing capacitor plates carried by said reference members.

4. Apparatus for determining the pressure setting of a valve as defined in claim 1 in which
   one of said reference members has a magnetic gripping device for retaining it in position.

5. A pressure relief valve testing apparatus for a pressure relief valve having a body with a yoke and yoke rods, a valve disc, a valve spindle extending from said valve disc with spring abutment thereon and a spring engaging said abutment urging said valve disc to seated position, comprising
   a fluid pressure responsive actuating device mounted on said yoke and connected to said spindle at the end remote from said valve disc for impelling said valve disc from said seat against the force of said spring, means for supplying pressure fluid to said device, an indicating member for indicating the pressure applied on said actuating device, a clamp detachably secured to said valve spindle between said spring abutment and said valve disc, an arm extending from said clamp and movable therewith, a reference arm carried by one of said yoke rods and with respect to which said movable arm is moved by said actuating device, and members for determining the relative movement of said arms upon incipient movement of the valve disc from its seat.

6. Pressure relief valve testing apparatus as defined in claim 5 in which said reference arm has a magnetic gripping member engaging said one of said yoke rods.

7. Pressure relief valve testing apparatus as defined in claim 5 in which said arms have capacitor plates thereon, a capacitance change responsive member is provided connected to said plates, and said last member has a visual indicator of change of capacitance at said plates.

8. Pressure relief valve testing apparatus as defined in claim 7 in which one of said plates has a mounting on one of said arms for adjustable positioning thereof along said arm, and one of said plates has a free pivotal mounting for establishing initial parallelism of said plates.

References Cited by the Examiner
UNITED STATES PATENTS

| | | | |
|---|---|---|---|
| 1,637,743 | 8/1927 | Fine | 73—4 |
| 2,419,293 | 4/1947 | Simonson | 73—4 |
| 2,952,151 | 9/1960 | Simonson et al. | 73—4 |

LOUIS R. PRINCE, *Primary Examiner.*

S. C. SWISHER, *Assistant Examiner.*